Aug. 31, 1937.  A. W. PRANCE  2,091,490
LAMP ASSEMBLY
Filed March 30, 1936
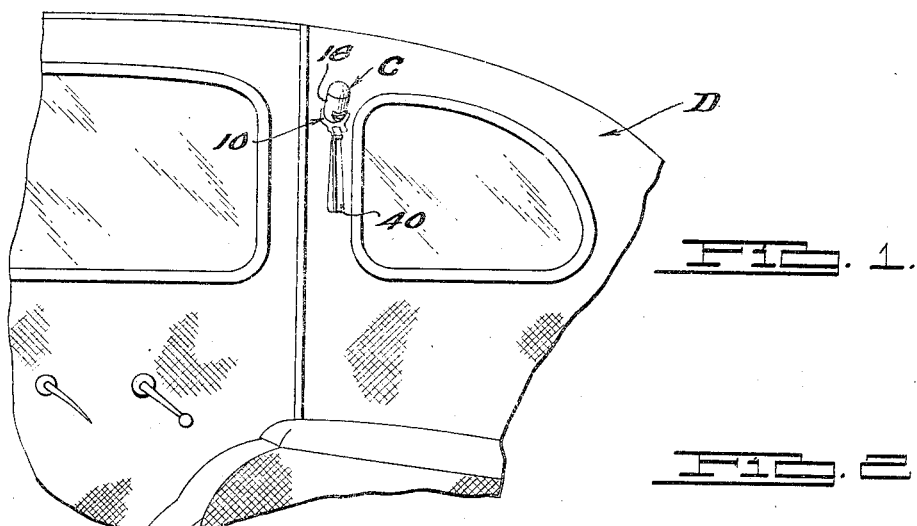
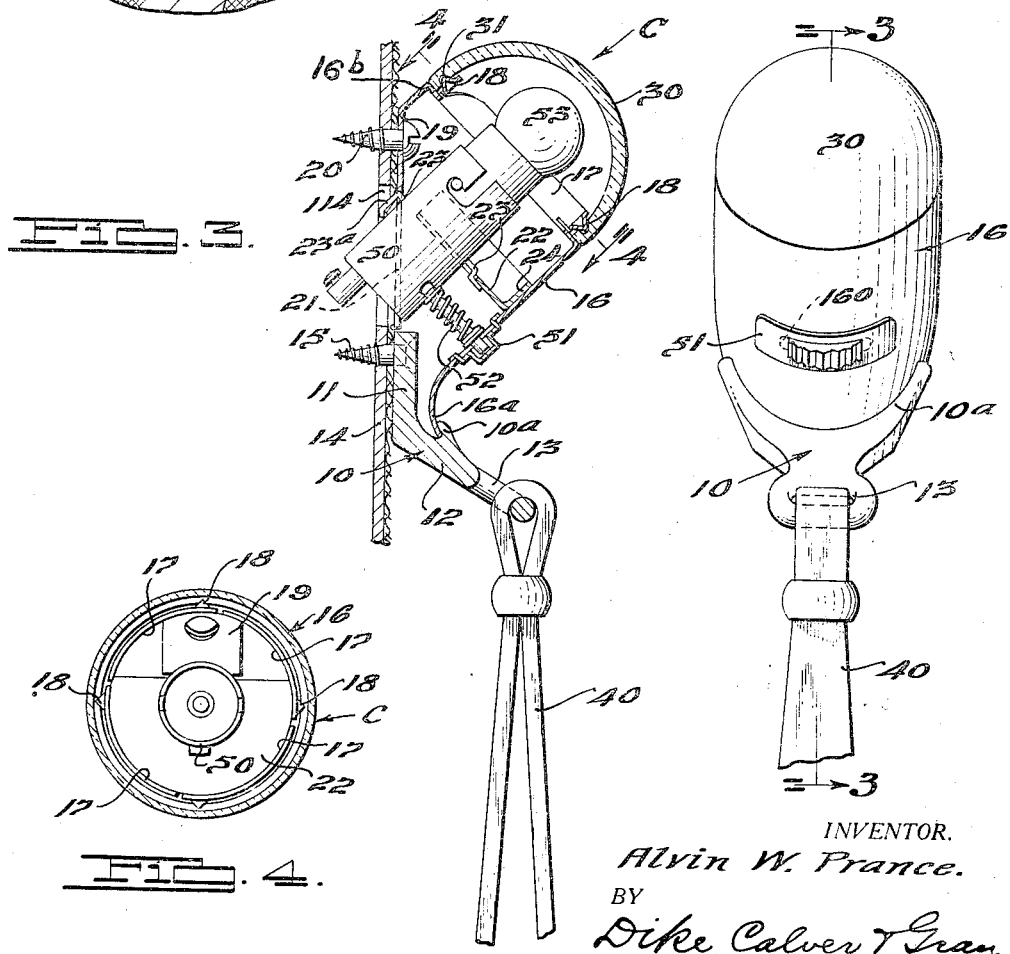
INVENTOR.
Alvin W. Prance.
BY
Dike, Calver & Gray
ATTORNEYS.

Patented Aug. 31, 1937

2,091,490

UNITED STATES PATENT OFFICE 2,091,490

LAMP ASSEMBLY

Alvin W. Prance, Pleasant Ridge, Mich., assignor to Briggs Manufacturing Company, Detroit, Mich., a corporation of Michigan Application March 30, 1936, Serial No. 71,582

5 Claims. (Cl. 240—7.1)

This invention relates to ornamental lamp assemblies adapted particularly, although not exclusively, for use in the interiors of vehicle bodies, such as enclosed vehicle bodies, and more especially to a combined lamp and hand grip or assist cord assembly adapted to be mounted upon the interior wall of the body.

One of the objects of the present invention is to provide an improved lamp assembly and hand grip structure having a common mounting or supporting bracket for removably attaching or connecting the assembly to a supporting surface, and one in which the lamp casing is so constructed and arranged as to be free from any substantial strains and pulling forces exerted upon the hand grip.

Another object of the invention is to provide an improved lamp assembly of the foregoing character in which the strains and forces applied to the hand grip or assist cord are transmitted to and absorbed by the supporting surface upon which the lamp assembly is mounted, such, for example, as the frame structure of a vehicle body.

Another object of the invention is to provide a lamp assembly which is of comparatively simple construction, relatively few parts which are capable of easy and quick assembly, and one which can be attached to or removed from its supporting surface easily and expeditiously.

The above and other objects and advantages of the invention will appear from the following description and appended claims when considered in connection with the accompanying drawing forming a part of this specification.

In said drawing:

Fig. 1 is a fragmentary perspective view of the interior or rear tonneau of a vehicle body of the enclosed type, embodying one form of the present invention.

Fig. 2 is a front elevation, on an enlarged scale and partly broken away, of the lamp assembly of Fig. 1.

Fig. 3 is a vertical section taken substantially along the line 3—3 of Fig. 2, looking in the direction of the arrows; and Fig. 4 is a section taken substantially along the line 4—4 of Fig. 3, looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to the drawing, the embodiment of the invention therein shown comprises an ornamental lamp assembly shown as a whole at C adapted to be removably mounted upon a wall or support such, for example, as the rear quarter panel D or the adjacent door pillar of an enclosed vehicle body, as illustrated in Fig. 1. The lamp assembly C comprises a supporting bracket or mounting shown as a whole at 10, having a body portion or leg 11 and an angularly extending or projecting portion 12, the latter having a bead or lip 10a behind which an undercut groove is located. The outer free end of the portion 12 is provided with an eye or opening 13. The bracket 10 is preferably secured to a supporting wall or surface 14, such as a body frame member, by means of a metal screw 15, see Fig. 3. The lamp casing or body per se is shown as a whole at 16 and comprises a substantially round or cylindrical casing adapted to be mounted upon the panel 14 and to engage the supporting bracket or mounting 10. When applied to the wall 14 and supporting bracket, the casing remains in inclined position and conceals a portion of the bracket 10. The top edge of the casing wall is turned inwardly at 16b and then upwardly and outwardly to provide an annular upright projecting flange which, as shown, is split or divided into a plurality of sections or segments 17, four such being shown. The flange 17 projects outwardly beyond the upper end of the casing walls (see Fig. 3) and provides a socket member for receiving and supporting a cap or dome as hereinafter explained. Each of the flange sections 17 is provided with an external projection or lug 18. The lugs, as shown, are formed from the metal of the flange. The casing 16 has a rear wall or depending portion 19 which serves as means for attaching or mounting the casing upon the support 14. The casing is held in position upon the support by a metal screw 20 which passes through a hole in the wall 19 and is threaded into the support 14. The support 14 is provided with an opening 114 and the casing rear wall 19 is cut away or bifurcated to provide an opening 21. The openings 21 and 114 are in register when the casing is applied to the wall 14, see Fig. 3. The casing 16, as shown, has an interior sectional partition comprising cooperating portions 22 and 23, the portion 23 having a portion or flange 23a engaging the rear wall 19 and the portion 22 having a flange 24 which may be attached to the wall of the casing 16 in any suitable manner, as by spot welding. The partition may be made of the proper size to fit snugly within the casing, in which case it is unnecessary to secure the flanges thereto. The partition is preferably apertured to receive and support a conventional electric light socket or body 50 having a switch (not shown) operated by a manual switch control member 51 mounted for sliding movement on the outer face of the casing 16, see Figs. 2 and 3. The stem or shank 52 of the switch control extends through a slot 160 formed in the casing. The lamp socket 50 carries a lamp bulb 53.

The lower end of the casing is curved and flared outwardly at 16a, see Fig. 3, so that when the casing is assembled with the bracket 10 the lower edge of the casing portion 16a engages and rests within an undercut groove located behind a bead or lip 10a of the bracket. Thus the lower portion of the casing is anchored by the bracket in position upon the wall 14. The bead and groove are curved in their length to correspond to the curve or contour of the casing portion 16a so that the parts cooperate and interfit, as shown.

The open top of the casing 16 is closed by a removable dome or globe 30 formed of any suitable translucent material such, for example, as frosted glass, celluloid or other material so that the lamp will emit a diffused light. The dome 30 is provided with an internal annular groove or series of grooves or slots 31 which engage and cooperate with the lugs 18 of the socket or flange 17 to hold the dome in place upon the casing. The dome is held in place under tension and against accidental displacement, inherent springiness of the metal forming the several sections of the flange or socket member 17. When the dome is slipped over the socket, the sections 17 thereof are compressed or flexed inwardly to permit the lugs to be engaged with the notches or groove formed in the dome. After the lugs have entered and seated in the notches or slots, the flange portions 17 flex or spring outwardly to their original or normal positions and bind against the dome to releasably lock the parts together.

The lamp assembly of the present embodiment of the invention may be installed upon its supporting surface or wall as follows: The bracket 10 is first mounted upon the support 14 by means of the metal screw 15. The socket 50 and switch control or operating members 51 and 52 are assembled with the casing 16. The casing is then applied to the support by inserting the flared lower edge 16a thereof into the undercut groove behind the bead or lip 10a of the bracket, and the rear wall 19 moved into contact with the face of the wall or support 14. As seen in Fig. 3, the end of the lamp socket 50 projects through the registering openings 21 and 114. The metal screw 20 is then passed through the wall 19 and threaded into the support 14 to secure the lamp casing in place upon the support and in cooperative relation with the bracket 10. The lamp bulb 53 is then applied to the lamp socket 50. The dome 30 is then attached to the top of the casing by bringing the dome grooves 31 and lugs 18 of the split socket 17 into cooperative relation to hold the dome in place upon the casing. It will thus be seen that it is possible to install the lamp assembly upon a supporting surface with ease and facility and it is likewise possible to remove the assembly or fixture from the support easily and quickly, if and when this is desired.

The eye or opening 13 formed in the exposed portion 12 of the bracket or mounting provides means for receiving and supporting a hand grip or assist cord 40 which, as shown merely for purposes of illustration, is in the form of a leather or fabric strap. While there is shown a strap-like hand grip or assist, it will be understood that any other type of assist cord may be applied to the exposed portion of the supporting bracket. Any strain or pulling forces applied to the hand grip 40 is taken by the mounting or supporting bracket 10 and transmitted thereby to the support which, in the present illustration, is the frame member of the wall 14 of the vehicle rear quarter panel D. Thus the support or frame member 14 actually receives all of the strain and forces applied to the hand grip or assist cord 40, thereby relieving the lamp casing 16 of all such strains and forces.

From the foregoing it will be seen that I have provided a lamp assembly which combines the feature of interior body lighting with means for assisting the occupant or occupants of the vehicle to rise from the vehicle seat. The lamp assembly herein illustrated is of comparatively simple construction, ornamental, relatively inexpensive to manufacture and easy to assemble and disassemble and to apply to and remove from a supporting surface, such as the frame structure of a vehicle body as shown, merely by way of illustration, in the accompanying drawing.

I claim:

1. In a lamp and assist cord assembly, a lamp casing having a back flange adapted to secured to a support, a bracket attached to said support interiorly of the casing and supporting a portion of said casing, said bracket having a portion located exteriorly of the casing, the last named portion having an eye formed therein, and an assist cord extending through said eye and secured to said last named portion.

2. A lamp assembly for use in the interior of a vehicle body, comprising a metal casing and a hand hold associated therewith, said casing and hand hold being adapted to be removably attached to an upright supporting surface, and a common supporting bracket for said casing and hand hold, said bracket having a substantially concealed base portion adapted to be removably mounted upon said supporting surface and an offset outwardly extending exposed portion for receiving and supporting said hand hold, said bracket having an arcuate groove formed therein for receiving the lower edge of said casing, said bracket being adapted to receive pulling forces applied to said hand hold and transmit them directly to said supporting surface whereby to relieve said casing of said forces.

3. A lamp assembly for use in the interior of a vehicle body, comprising a metal casing and a hand hold associated therewith, said casing and hand hold being adapted to be removably attached to an upright supporting surface, and a common supporting bracket for said casing and hand hold, said bracket having a substantially concealed base portion adapted to be removably mounted upon said supporting surface and having an offset outwardly extending exposed portion for receiving and supporting said hand hold, said bracket having a bead and an undercut groove formed in its top face for receiving the lower edge of said casing, said bracket being adapted to receive pulling forces applied to said hand hold and transmit them directly to said supporting surface whereby to relieve said casing of said forces, said casing being positioned in an inclined plane upon the supporting surface.

4. A lamp assembly for use in the interior of a vehicle body, comprising a metal casing and a hand hold associated therewith, said casing and hand hold being adapted to be removably attached to an upright supporting surface, and a common supporting bracket for said casing and hand hold, said bracket having a substantially concealed base portion adapted to be removably mounted upon said supporting surface and an exposed portion for receiving and supporting said hand hold, said bracket being adapted to receive pulling forces applied to said hand hold and transmit them directly to said supporting surface whereby to relieve said casing of said forces.

5. A lamp assembly for use in the interior of a vehicle body, comprising a metal casing and a hand hold associated therewith, said casing and hand hold being adapted to be removably attached to an upright supporting surface, and a common supporting bracket for said casing and hand hold, said bracket having a substantially concealed base portion adapted to be removably mounted upon said supporting surface and having an exposed portion for receiving and supporting said hand hold, said bracket having a bead and an undercut groove formed in its top face for receiving the lower edge of said casing, said bracket being adapted to receive pulling forces applied to said hand hold and transmit them directly to said supporting surface whereby to relieve said casing of said forces.

ALVIN W. PRANCE.